US008510754B1

(12) United States Patent
Lozben et al.

(10) Patent No.: US 8,510,754 B1
(45) Date of Patent: *Aug. 13, 2013

(54) SHARED PERSISTENT OBJECTS

(75) Inventors: Slavik Lozben, San Francisco, CA (US);
Pritham Shetty, Los Altos, CA (US);
Jonathan Gay, Mill Valley, CA (US);
Bradley Edelman, San Francisco, CA
(US); Stephen Cheng, Foster City, CA
(US)

(73) Assignee: Adobe Systems Incorporated, San Jose, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/094,762

(22) Filed: Apr. 26, 2011

Related U.S. Application Data

(63) Continuation of application No. 11/853,978, filed on Sep. 12, 2007, now Pat. No. 7,945,916, which is a continuation of application No. 10/402,357, filed on Mar. 28, 2003, now Pat. No. 7,287,256.

(51) Int. Cl.
*G06F 9/46* (2006.01)

(52) U.S. Cl.
USPC ............................ 719/316; 709/224; 709/248

(58) Field of Classification Search
USPC .................................. 719/316; 709/224, 248
See application file for complete search history.

(56) References Cited

U.S. PATENT DOCUMENTS

| | | | |
|---|---|---|---|
| 4,991,168 A | 2/1991 | Richards | |
| 5,577,028 A | 11/1996 | Chugo et al. | |
| 5,751,968 A | 5/1998 | Cohen | |
| 5,805,804 A | 9/1998 | Laursen et al. | |
| 5,841,432 A | 11/1998 | Carmel et al. | |
| 5,892,915 A | 4/1999 | Duso et al. | |
| 5,956,719 A | 9/1999 | Kudo et al. | |
| 5,996,025 A | 11/1999 | Day et al. | |
| 6,023,271 A | 2/2000 | Quaeler-Bock et al. | |
| 6,044,205 A | 3/2000 | Reed et al. | |
| 6,064,379 A | 5/2000 | DeMoney | |
| 6,085,252 A | 7/2000 | Zhu et al. | |
| 6,105,072 A | 8/2000 | Fischer | |
| 6,112,024 A | 8/2000 | Almond et al. | |
| 6,125,369 A | 9/2000 | Wu et al. | |
| 6,148,334 A | 11/2000 | Imai et al. | |
| 6,163,796 A | 12/2000 | Yokomizo | |
| 6,216,157 B1 | 4/2001 | Vishwanath et al. | |
| 6,307,856 B1 | 10/2001 | Imai | |
| 6,330,006 B1 | 12/2001 | Goodisman | |
| 6,393,486 B1 | 5/2002 | Pelavin et al. | |

(Continued)

OTHER PUBLICATIONS

Advantages of On2 VP6 Technology, Oct. 20, 2006, published by On2 Technologies, Inc., 18 pages.

(Continued)

*Primary Examiner* — Van Nguyen
(74) *Attorney, Agent, or Firm* — Finch & Maloney PLLC

(57) ABSTRACT

A system and method are disclosed for an interactive multimedia file (iMF), running on an interactive multimedia runtime (iMR), to store an object onto a computer, the method comprising creating a local instance of the object, storing the local instance into a memory location on the computer, monitoring changes to one or more data slots of the local instance, assigning a version identifier to the local instance, synchronizing the local instance with a main instance of the object, and interfacing the one or more data slots of the local instance with said iMF during execution.

28 Claims, 7 Drawing Sheets

(56) References Cited

U.S. PATENT DOCUMENTS

| | | | |
|---|---|---|---|
| 6,397,230 B1 | 5/2002 | Carmel et al. | |
| 6,453,355 B1 | 9/2002 | Jones et al. | |
| 6,477,580 B1 | 11/2002 | Bowman-Amuah | |
| 6,487,564 B1 | 11/2002 | Asai et al. | |
| 6,549,934 B1 | 4/2003 | Peterson et al. | |
| 6,631,418 B1 | 10/2003 | Watkins | |
| 6,633,244 B2 | 10/2003 | Avery et al. | |
| 6,665,865 B1 | 12/2003 | Ruf | |
| 6,760,378 B1 | 7/2004 | Conklin | |
| 6,763,390 B1 | 7/2004 | Kovacevic et al. | |
| 6,801,947 B1 | 10/2004 | Li | |
| 6,823,394 B2 | 11/2004 | Waldvogel et al. | |
| 6,877,010 B2 | 4/2005 | Smith-Semedo et al. | |
| 6,985,932 B1 | 1/2006 | Glaser et al. | |
| 6,990,497 B2 | 1/2006 | O'Rourke et al. | |
| 6,999,424 B1 | 2/2006 | Kovacevic et al. | |
| 7,003,570 B2 | 2/2006 | Messinger et al. | |
| 7,051,275 B2 * | 5/2006 | Gupta et al. | 715/201 |
| 7,133,922 B1 | 11/2006 | She et al. | |
| 7,149,813 B2 | 12/2006 | Flanagin et al. | |
| 7,185,099 B1 | 2/2007 | Block | |
| 7,197,531 B2 | 3/2007 | Anderson | |
| 7,272,658 B1 | 9/2007 | Edelman et al. | |
| 7,287,256 B1 | 10/2007 | Lozben et al. | |
| 7,346,669 B2 | 3/2008 | Anderson | |
| 7,383,289 B2 | 6/2008 | Kraft et al. | |
| 7,472,349 B1 | 12/2008 | Srivastava et al. | |
| 7,548,948 B2 | 6/2009 | Klemets et al. | |
| 7,716,345 B2 | 5/2010 | Klemets | |
| 7,945,916 B1 * | 5/2011 | Lozben et al. | 719/316 |
| 2001/0004417 A1 | 6/2001 | Narutoshi et al. | |
| 2001/0044851 A1 | 11/2001 | Rothman et al. | |
| 2002/0055989 A1 | 5/2002 | Stringer-Calvert et al. | |
| 2002/0065926 A1 | 5/2002 | Hackney et al. | |
| 2002/0103815 A1 | 8/2002 | Duvillier et al. | |
| 2002/0116716 A1 | 8/2002 | Sideman | |
| 2002/0165907 A1 | 11/2002 | Dornquast et al. | |
| 2003/0046431 A1 | 3/2003 | Belleguie | |
| 2003/0055862 A1 | 3/2003 | Bhat | |
| 2003/0061369 A1 | 3/2003 | Aksu et al. | |
| 2003/0115268 A1 | 6/2003 | Esposito | |
| 2003/0154239 A1 | 8/2003 | Davis et al. | |
| 2003/0187993 A1 | 10/2003 | Ribot | |
| 2003/0196164 A1 * | 10/2003 | Gupta et al. | 715/500.1 |
| 2003/0221014 A1 | 11/2003 | Kosiba et al. | |
| 2004/0032424 A1 | 2/2004 | Florschuetz | |
| 2004/0098533 A1 | 5/2004 | Henshaw et al. | |
| 2004/0215803 A1 | 10/2004 | Yamada et al. | |
| 2005/0102427 A1 | 5/2005 | Yokota et al. | |
| 2006/0161516 A1 | 7/2006 | Clarke et al. | |
| 2006/0224687 A1 | 10/2006 | Popkin et al. | |
| 2008/0256255 A1 | 10/2008 | Mordovskoi et al. | |
| 2009/0106386 A1 | 4/2009 | Zuckerman et al. | |
| 2009/0271525 A1 | 10/2009 | Jung et al. | |

OTHER PUBLICATIONS

Chapter 6: What is Streaming Media and How does it Work?, Jul. 18, 2007, published by the Internet, <http://service.real.comlhelp/player/plus manual. g2/htrnlfiles/whatisrp .htm, 13 pages.

"Common Multimedia Formats and Extentions"., Jul. 18, 2007, published by SorensonMedia, <http://www.sorensontech.comllearn/video_file_format.php>, 2 pages.

Quicktime Streaming Server Administrator's Guide. 2002, published by Apple Computer, Inc. 2002, 84 pages.

"Real Time Messaging Protocol Chunk Stream", Apr. 2009, Adobe Systems Incorporated, 70 pages.

Schulzrinne, H. et al. "Real Time Streaming Protocol (RTSP)", Apr. 1998, published by the Internet Society, 86 pages.

"Truemotion VP7 Video Codec", Jan. 10, 2005, published by On2 Technologies, Inc., 13 pages.

International Standard, "Information Technology—Coding of Audio-Visual Objects, Part 12: ISO Base Media File Format" Apr. 1, 2005, ISO/IEC 14496-12, 94 pages.

Swaminathan et al., "Media Content Streaming," U.S. Appl. No. 12/542,552, filed Aug. 17, 2009, to be published by the USPTO, 43 pages.

Swaminathan et al., "Hint Based Media Content Streaming," U.S. Appl. No. 12/542,582, filed Aug. 17, 2009, to be published by the USPTO, 38 pages.

* cited by examiner

SHARED PERSISTENT OBJECTS

CROSS-REFERENCE TO RELATED APPLICATIONS

The present application is a continuation of commonly assigned, U.S. patent application Ser. No. 11/853,978 entitled "SHARED PERSISTENT OBJECTS," filed Sep. 12, 2007, now U.S. Pat. No. 7,945,916, which is a continuation of U.S. patent application Ser. No. 10/402,357 entitled "SHARED PERSISTENT OBJECTS," filed Mar. 28, 2003, now U.S. Pat. No. 7,287,256, the disclosure of which is hereby incorporated herein by reference.

TECHNICAL FIELD

The present invention relates, in general, to distributed computing, and, more particularly, to shared media.

BACKGROUND OF THE INVENTION

The client-server relationship has opened vast areas of network operability. Whether implemented in a local area network (LAN) or the Internet, the interaction between client entities and a centralized server forms the basis of the computing world today. Applications routinely incorporate remote use of data or logic to manage inventory, employees, sales, and other such activities. Early client-server applications involved remote access to databases to provide data for locally running applications. The management of such distributed functionality has advanced with several programming techniques and architectures. MICROSOFT CORPORATION'S Distributed Component Object Model (DCOM) and Common Object Request Broker Architecture (CORBA), developed by Object Management Group, are just two examples of architectures and specifications that allow programs at different locations, and possibly developed by different vendors, to communicate in a network through an interface broker.

With CORBA, the essential concept is the Object Request Broker (ORB). ORB support across a network of multiple computers with multiple clients and servers allows for a client program to request services from a server program or object without having to completely understand where that server program or object is, or what the interface to that server program or object requires. ORB's communicate requests and return replies by using the General Inter-ORB Protocol (GIOP) and, when used across the Internet, Internet Inter-ORB Protocol (IIOP). IIOP generally maps GIOP requests and replies into the Transmission Control Protocol (TCP) layer for each computer. Thus, the interfacing of the different entities is transparent to the user. DCOM works in a similar manner using TCP/Internet Protocol (TCP/IP) and hypertext transfer protocol (HTTP) to communicate remote procedure calls (RPCs) to the compatible server objects.

Both DCOM and CORBA follow a similar step-by-step process. A local application or object requests services from another, remote object. The remote object is located using the class ID (CLSID), for DCOM, or client ORB, for CORBA. This broker or agent arrangement operates in a similar manner to the stub and skeleton architecture used in Remote Procedure Call (RPC) communication. The stub, which is a small piece of communication code on the client system, operates as the proxy with the remote server, performing all communications with the skeleton, which is the corresponding communication code on the remote server. Therefore, the client does not have to address the different interface possibilities with the remote server. Once the request for service has reached the server object at the remote server, an instance of the object is downloaded to the client. The client may then run the instantiated object locally using the local user interface.

The common thread with DCOM and CORBA is that the distributed management performed by each architecture is directed to distributed computing. Code may be persistent between sessions and RPCs; data is not. Therefore, while logic may persist between sessions, data is only session-specific.

Another tool of distributed or remote interactive computing is the cookie. A cookie is data created by a server-side connection, such as a common gateway interface (CGI) script, that can be used to both store and retrieve information on the client side of the connection. This addition of a simple, persistent, client-side state significantly extends capabilities of Web-based client-server applications. The standard specification for cookies began with NETSCAPE COMMUNICATION CORPORATION's "Persistent Client State HTTP Cookies" and continues with RFC 2109—"HTTP State Management Mechanism" issued by the Network Working Group of the Internet Engineering Task Force (IETF). These specifications define a size limit of 4096 bytes per cookie. Moreover, a limit of 20 cookies per Web server is also defined, which means than any one Web server can store a maximum of 20 4096-byte cookies on every client computer.

Cookies provide a way for Web sites to keep track of user patterns and preferences, and, with the cooperation of the Web browser, store the cookies on the client computer. Hypertext Transfer Protocol (HTTP), which is the transfer protocol of the Web, is a stateless protocol, such that each request for a Web page is independent of all other such requests. Therefore, the Web page server has no memory of the current state (i.e., what pages or information has previously been sent to or exchanged with the client computer). Cookies provide the ability for the user to experience a personalized session by providing the Web page and Web page server data that creates a remembered state of the user Web interaction.

In a typical example of operation, when a user at a client computer runs its Web browser and types in a Universal Resource Locator (URL), such as www.macromedia.com, the browser communicates with the Web server and requests the macromedia.com home page. On the client-side, once the request is made, the browser searches its cookie file for cookies designated for macromedia.com. If none are found, no cookies are sent. On the server-side, the macromedia.com Web server receives the request and attempts to read any cookies that may be transmitted from the requesting browser. If none are available, the Web server determines that this is the first time the client-browser has visited the macromedia.com Web site. The macromedia.com Web server may then direct that a cookie or cookies be saved onto the client computer marking the visit and identifying the client-side computer. When the client computer next makes a request for the macromedia.com home page, it will now typically send the cookies designated for the macromedia.com Web site. The macromedia.com Web site will read the cookies and be able to adjust the user experience at the client-side using this "state" information.

Some cookies persist only until the end of a specific browser session. Meaning that when the browser program is closed, the cookies are erased. However, when some cookies are created, they include an expiration date after which the cookie will expire and be erased from the designated cookie file. Thus, those cookies persist from one browser session to another residing on the client computer until the expiration date has been reached. Cookies may also be erased if the maximum cookie limit, which is a standard specification, is exceeded. In this situation, the most least accessed cookies will typically be deleted first. Therefore, most cookies are set once and then go away either (1) at the close of the current browser session; (2) until the cookie expiration date is reached; or (2) when the maximum number of cookies has been exceeded.

Cookies provide an adequate tool for simple Web interactions, such as remembering login information, setting up a shopping cart in an e-commerce Web site, or tracking user history information. However, for more complicated distributed Internet applications, cookies are somewhat inadequate. Cookies are limited solely to text formatting. Therefore, they can provide no distributed functionality or logic. Cookies are also single-version data. Once the cookie information is set, it does not change until the cookie expires. New information must generally be saved as a new cookie. Furthermore, cookies are accessible by URL paths, so the capability exists for many different URLs may have an opportunity to use that information by including many different URLs in the path property of the cookie.

BRIEF SUMMARY OF THE INVENTION

Representative embodiments are directed to a method for an interactive multimedia file (iMF), running on an interactive multimedia runtime (iMR), to store an object onto a computer executing the iMR, the iMF processing with the object during operation the method comprising creating a local instance of the object, storing the local instance into a memory location on the computer, monitoring changes to one or more data slots of the local instance, assigning a version identifier to the local instance, synchronizing the local instance with a main instance of the object, and providing the local instance to the iMF for processing during operation of the iMF.

Additional representative embodiments are directed to an application programming interface (API) having a plurality of instructions accessible by a developer, wherein the plurality of instructions abstract manipulation of an object, the object having a local instance and a central instance, the API comprising a storage interface underlying the instructions for storing the local instance on a computer responsive to an interactive multimedia file (iMF) playing on an interactive multimedia runtime (iMR), wherein the storage interface maintains a local version indicator of the local instance, and wherein the iMF uses the local instance in operation on the iMR, a communication interface underlying the instructions for communicating with an interactive multimedia communication server (iMCS), wherein the central instance is stored on the iMCS, the central instance including a central version indicator for each of a plurality of properties of the object, and a version interface underlying the instructions for comparing the local version indicator with a corresponding one of the central version indicators, wherein the version interface determines which of the local instance and the central instance is to be updated.

Additional representative embodiments are directed to a computer program product having a computer readable medium with computer program logic recorded thereon for manipulating an object across a network, the computer program product comprising code accessible by a designer for selecting a constructor method for locally creating an abstract data type for use in an interactive multimedia file (iMF) locally running on an interactive multimedia runtime (iMR), wherein the abstract data type is either locally accessible only or remotely accessible, wherein a remote abstract data type exists on an interactive multimedia communication server (iMCS) corresponding to the remotely accessible abstract data type, code accessible by a designer for selecting an edit method to modify a plurality of data slots in the abstract data type, and code for synchronizing the locally created abstract data type and the remote abstract data type to harmonize the plurality of data slots.

Additional representative embodiments are directed to a method for securing a local shared object comprising receiving a request from an interactive multimedia file (iMF) to create the local shared object under a requested name, creating an instance of the shared object using the requested name, storing the instance at a path location defined using a file path of the iMF and denying access to the instance by any requesting entity whose path does not match the path location.

Additional representative embodiments are directed to a computer program product having a computer readable medium with computer program logic recorded thereon, the computer program product comprising code for receiving a request from an interactive multimedia file (iMF) to construct a local shared object using a user-designated name, code for creating an instance of the shared object using the user-designated name, code for storing the instance at a path location defined using a file path of the iMF, and code for denying access to the instance by any requesting entity whose path does not match the path location.

Additional representative embodiments are directed to a method for an interactive multimedia file (iMF), running on an interactive multimedia runtime (iMR), to store an object onto a computer executing the iMR, the iMF processing with the object during operation, the method comprising storing the object into a memory location on the computer, monitoring changes to one or more data slots of the object, assigning a version identifier to the object, and providing the object to the iMF for processing during operation of the iMF.

Additional representative embodiments are directed to a computer program product having a computer readable medium with computer program logic recorded thereon for an interactive multimedia file (iMF), running on an interactive multimedia runtime (iMR), to store an object onto a computer executing said iMR, the iMF processing with the object during operation, the computer program product comprising code for storing the object into a memory location on the computer, code for monitoring changes to one or more data slots of the object, code for assigning a version identifier to the object, and code for providing the object to the iMF for processing during operation of the iMF.

Further representative embodiments are directed to a computer program product having a computer readable medium with computer program logic recorded thereon for manipulating an object across a network, the computer program product comprising code accessible by a designer for selecting a constructor method for locally creating an abstract data type for use in an interactive multimedia file (iMF) running on an interactive multimedia runtime (iMR), wherein the abstract data type is either locally accessible only or remotely accessible, code accessible by a designer for selecting an edit method to modify a plurality of data slots in the abstract data type, code for establishing a version indicator representing an version of the plurality of data slots, wherein the version indicator is compared with a set of remote version indicators when the abstract data type is remotely accessible, and code for synchronizing the locally created abstract data type and the remotely accessible abstract to harmonize the plurality of data slots.

DETAILED DESCRIPTION OF THE INVENTION

Instead of providing distributed computing using the persistent code attributes of DCOM or CORBA that do not have the capability for handling persistent data or using cookies that have a limited ability for persistent data without the capability for providing persistent or distributed code, representative embodiments of the present invention provide a distributed object that may be shared in real-time by any accessible client. The complex functionality of the shared distributed object is presented to a designer through a collection of abstract data types in an application programming interface (API), such that a designer with minimal programming skills and experience may effectively implement extremely complex features.

Figure 1A:
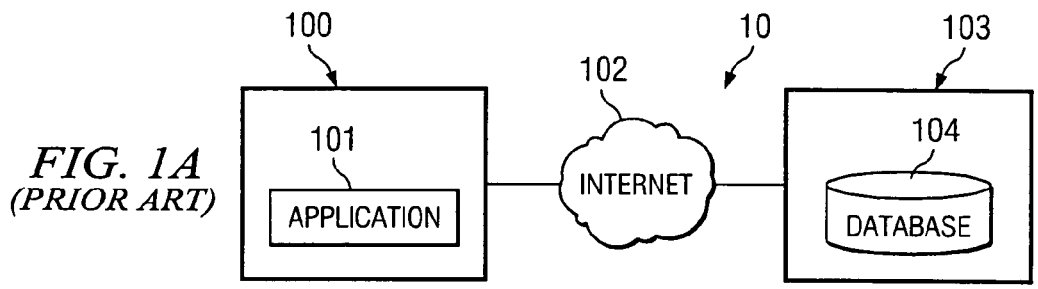
FIG. 1A is a block diagram illustrating a typical client-server architecture.

FIG. 1A is a block diagram illustrating typical client-server architecture 10. Client computer 100 runs application 101 and has a connection to Internet 102. As application 101 desires remote data input, client computer 100 establishes a connection with server 103 over Internet 102. Application 101 may provide identification information that would trigger server 103 to send specific information from database 104 back to client computer 100 for use in application 101. In this architecture, once data from database 104 is transmitted to application 101, it may be manipulated and processed at application 101. However, unless client-server architecture 10 includes additional programming that allows application 101 to re-transmit the processed data back for storage in database 104. the data remains only in client 100.

Figure 2:
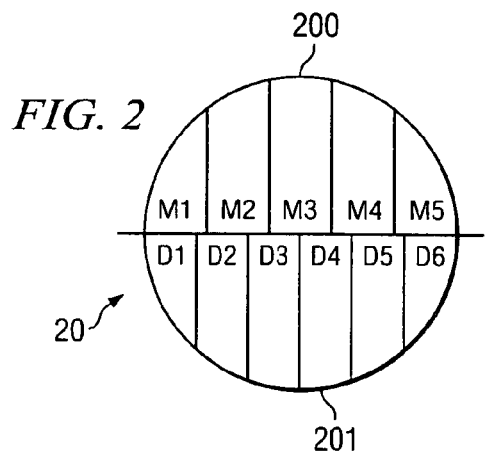
FIG. 2 is a conceptualized illustration of a typical object-oriented programming (OOP) object.

Object-Oriented Programming (OOP) is a well-known programming technique that decomposes problems into a collection of intercommunicating, self-contained entities composed of data and operations on the data. These self-contained entities are called objects. Objects typically have an internal state, which are the current values of its data, and methods, which are typically the only means by which the object's state can be inspected, modified, or processed by another object. FIG. 2 is a conceptualized illustration of object 20. Object 20 includes method portion 200 comprising individual methods M1-M5 and data portion 201 comprising data slots D1-D6. Data slots D1-D6 may contain items such as plain values or other objects. For example, data slot D1 may contain the string "December" or the integer "15" or even another object. Methods M1-M5 may contain logic instructions that may operate on the data contained in data slots D1-D6. For example, method M1 may contain logic for writing the value contained in data slot D1 to a certain memory location in the host computer.

Objects, once created, can be reused, can intercommunicate, and return values for any number of different desired tasks. An object has generally been shareable to the extent that the available data slots and corresponding methods are available to all host or client computers that have a copy of that object. However, the data or state information contained in an object on one host is typically not persistent across multiple hosts or clients. Thus, without more complexity added, typical instances of objects transmitted in DCOM and/or CORBA usually do not include any persistent data or state information.

Figure 1B:
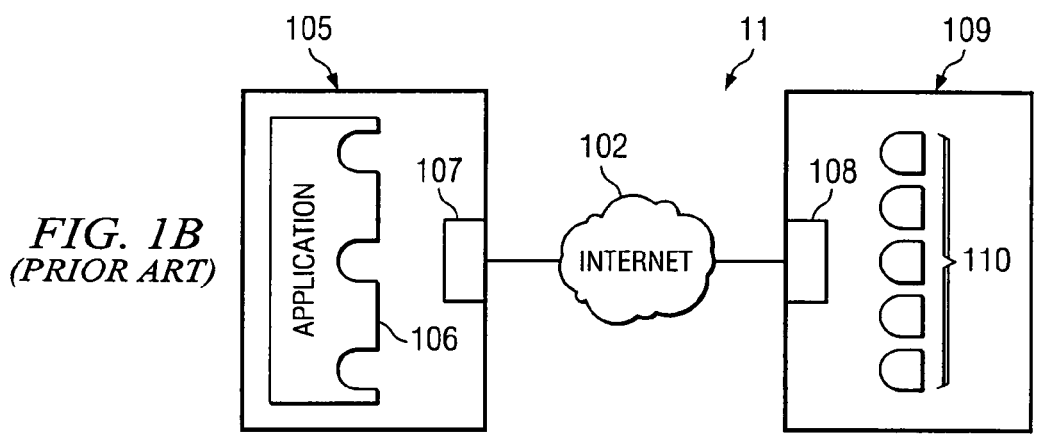
FIG. 1B is a block diagram illustrating an example of a distributed object architecture.

FIG. 1B is a block diagram illustrating an example of distributed object architecture 11. Distributed object architecture 11 resembles the implementation of DCOM and/or CORBA. Client computer 105 includes application 106 that may allow for remote services to perform some functionality or services for application 106. When services are desired in application 106, a request is made to server proxy 107. Server proxy 107 maintains all interface protocols for communicating with server 109 across Internet 102. Server proxy 107 calls across Internet 102 to proxy object 108 at server 109. Proxy object 108 manages the requests from server proxy 107. Depending on the specific function or service request, proxy object 108 selects one of distributed objects 110 for transmission back to application 106. Distributed object 110 is plugged into application 106 to perform the desired function. Distributed object 110 may persist in Application 106, but the user at client computer 105 may not modify distributed object 110 or send data to server 109 for operation with one of distributed objects 110.

Figure 1C:
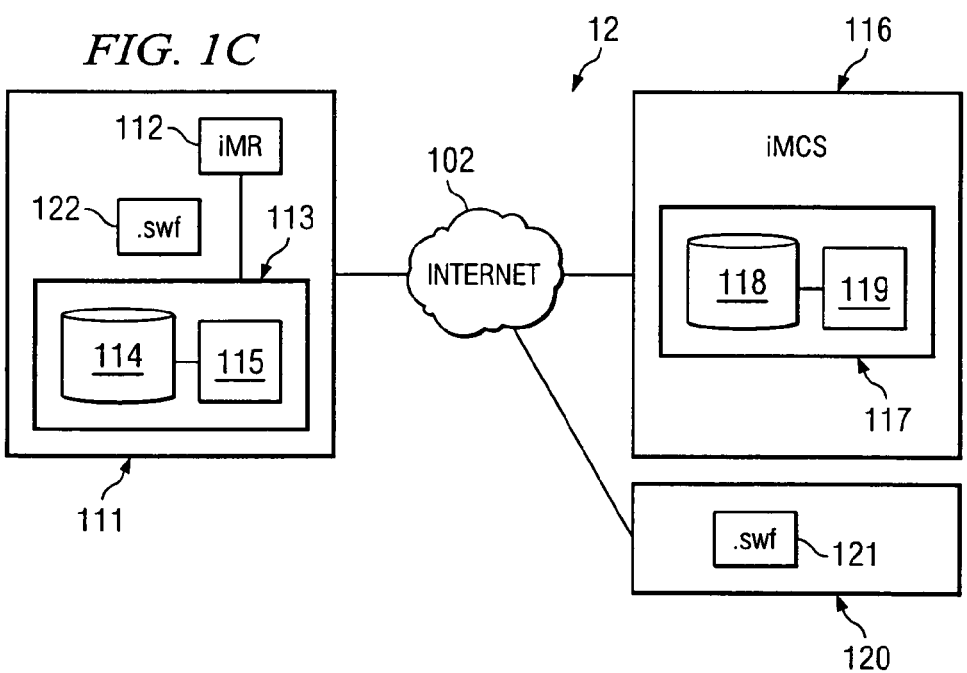
FIG. 1C is a block diagram illustrating a representative embodiment of the present invention implementing a shared object.

In contrast to the architectures shown in FIGS. 1A and 1B, FIG. 1C is a block diagram illustrating a representative embodiment of the present invention implementing shared object 113. Client computer 111 includes interactive multi-media runtime (iMR) 112, which is an application that may display and/or interact with compatible multimedia files. One example of such a multimedia application is MACROMEDIA's FLASH™ player. Files compatible with MACROMEDIA FLASH™ are typically small web file (.swf) format. Thus, iMR 112 may run and display content from local .swf file 122 or from remote .swf file 121, or even both. IMR 112 may direct shared object 113 to be stored locally on client 111. Shared object 113 comprises data 114 and logic 115. Data 114 and logic 115 of shared object 113 are used in the execution of the multimedia file. For instance, if iMR 112 were running .swf 121, in which .swf 121 were a shopping cart feature on an e-commerce Web site, shared object 113 may include data 114 for items in the shopping cart and logic 115 that would typically be a part of a shopping cart, such as inventory control, summing, tax calculations, and the like. IMR 112 may cause shared object 113 to be stored locally, resulting in the necessity of very few page calls to remote server 120 because data 114 and logic 115 are already local to client 111.

In operation with a communication server, such as iMCS 116, shared object 113 may also be "shared" by other clients with access to iMCS 116. IMR 112 establishes a shared resource with interactive multimedia communication server (iMCS) 116. An iMCS is a communication server with special capabilities for handling multimedia communication. One example of such an iMCS is MACROMEDIA's FLASH™ COMMUNICATION SERVER™. Following this association, main shared object 117 may be created. Main shared object 117 includes data 118 and logic 119. Periodically, iMR 112 contacts iMCS 116 and updates data 118 and logic 119 from data 114 and logic 115 of shared object 113. Therefore, the other sharing clients may maintain up-to-date information. In additional embodiments, main shared object 117 may originate from iMCS 116 with client 111, running iMR 112, subscribing to it.

The shared object, as described in the teachings of the present invention, acts as a logic and data repository for an iMR instance. The MACROMEDIA FLASH™ player is one example of an iMR. MACROMEDIA FLASH™ movies, i.e., .swf format files, may originate from remote or local storage areas for execution within the local instance of the MACROMEDIA FLASH™ player. Data and logic that may be necessary or usable by the multimedia file may be stored as a shared object. Rather than making remote requests or calls for such data and logic, the multimedia file may use local resources to store or maintain the data and logic used by the multimedia file. A multimedia file may be coded to implement a shopping cart, a card catalog system, a reservation system, or other such interactive and data dependent application. When data and logic are stored locally as a shared object, complex data operations may take place solely on the client computer without the need to keep an established connection to the remote server. The information processed on the client within the local shared object instance may periodically be communicated to the main instance of the main shared object on the remote server. Therefore, instead of waiting for entry and retrieval of information concerning an electronic transaction from a remote server, all of the entry, retrieval, and processing is completed on the client's system and then updating the remote instance. The interactive application would typically not need to refresh or page with new information retrieved from and stored to the remote server.

Figure 3:
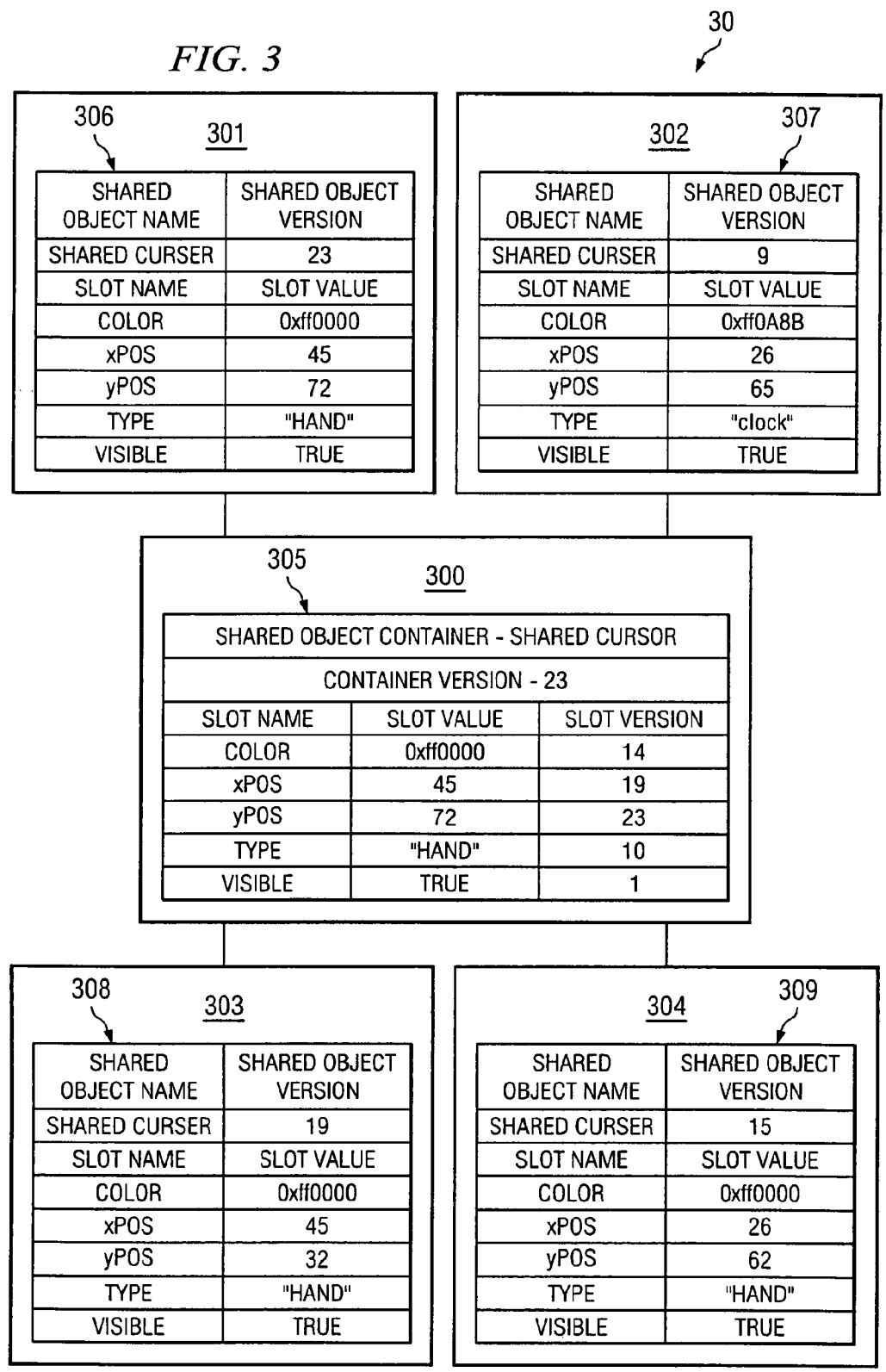
FIG. 3 is a conceptualized block diagram illustrating distributed shared object system implementing a representative embodiment configured according to the teachings of the present invention.

FIG. 3 is a conceptualized block diagram illustrating distributed shared object system 30 implementing a representative embodiment configured according to the teachings of the present invention. Distributed shared object system 30 comprises iMCS 300 configured with software or firmware instructions that facilitate client-server relationships and include interactive multimedia data. Clients 301-304 represent client computers each with a connection available to iMCS 300. Clients 301-304 preferably include corresponding software or firmware for processing an iMR capable of communicating with iMCS 300.

A shared object is created to maintain data and logic for an iMR in either a remote or local entity. In a remote or distributed system, shared objects may be used for multiple users to experience a singular multimedia experience. For example, in remote education applications, a teacher, at one location, may be operating an electronic white board to write notes, formulae, or the like. Each student, at a client computer may observe the activities on the electronic white board. Shared objects configured according to the teachings of the present invention may also be used to implement the remote education application. A shared object may be created to represent the white board cursor. Each client subscribes to the cursor shared object. As the data is updated on the white board, the information is updated and changed on each instance of the shared object.

Returning to FIG. 3, shared object 305 represents the main version stored on iMCS 300. The shared object container includes a name, SharedCursor, and the container version, 23. Shared object 305 includes data slots labeled color, xPos, yPos, type, and visible. The data slots contain state information or data for each of the slots or properties. The color slot holds the hexadecimal value for a type of red, 0xff0000. The x-axis position for the cursor, xPos, holds the value 45, that may represent which pixel grid number the cursor is currently positioned on in the x-direction. The y-axis position for the cursor, yPos, holds the value 72. The type of cursor slot holds the representation of "hand" to define the graphical representation of the cursor, and the visible slot holds "true" to indicate that the cursor is currently visible.

In order to maintain the correct versions for each of the accessing client computers, shared object 305 also includes a slot version for each of the data slots. The container version of shared object 305 represents the latest version of any of the noted data slots. The versioning system implemented by distributed shared object system 30 provides the ability for each of clients 301-304 to have information updated in real-time, or at least, as the latency of each connection to iMCS 300 allows.

Client 301 contains shared object 306. As client 301 checks in with iMCS 300, the current version of shared object 306 is passed along to iMCS 300. IMCS 300 compares the current version of shared object 306 with the container version of iMCS 300 to determine if shared object 306 is up to date. Because the current version for shared object 306 is the same as the container version for shared object 305, iMCS 300 determines that shared object 306 is up to date and requires no updated information.

Client 302 contains shared object 307. When client 302 checks in with iMCS 300, it shares the current version (9) of shared object 307. IMCS 300 determines that shared object 307's version is lower than the container version of shared object 305 and begins the updating process. Shared object 305 contains slot versions for each of the data slots of the shared object. IMCS 300 will check each slot version against the current version of shared object 307 and will transmit only the slot data for the slots that are out of date on shared object 307. Because shared object 307 has a current version of 9, iMCS 300 will send the updated slot information for the type (version 10), color (version 14), xPos (version 19), and yPos (version 23) slots. The large discrepancy in versions may have been a result of a high latency in the connection between client 302 and iMCS 300, or may have resulted from some other issue, such as if client 302 had been logged off of the network for a period of time and had just regained connection. Regardless of the reasoning, by comparing the current version of shared object 307 with the container version of shared object 305, shared object 307 is brought up to date.

Similarly, clients 303 and 304 contain shared objects 308 and 309, respectively. Shared object 308's version is 19, while shared object 309's version is 15. On analysis by iMCS 300, shared object 308 receive the updated version of slot yPos, and shared object 309 will receive the updated versions of slots xPos and yPos. Therefore, depending on how often clients 301-304 communicate with iMCS 300, each of shared objects 306-309 are brought up to date. When each of shared objects 306-309 are updated, the current versions are then changed to reflect the container value of shared object 305.

Therefore, unless any of the data changes again, the next check in period should not include any version updates. Neither DCOM, CORBA, nor cookies provide a mechanism for versioning the entire object.

In the example given above, a remote education application is described in which the typical scenario is the teacher lecturing and using the multimedia tools while the students, at the client computers, passively watch. The present invention also supports the complete interaction between the accessing client computers. For example, a multi-player game may be implemented in which each user at a client computer may control some aspect of movement on the graphical/multimedia display that will be viewable by the other accessing clients. Therefore, each client computer may be dictating changes to the shared objects that will typically need to be updated to each player on the system.

One simple method for maintaining the current versions of the distributed shared objects that would also facilitate the fully interactive uses would be to exchange complete copies of the shared object at pre-defined intervals. However, because shared objects are not strictly limited in size, nor are the client computers strictly limited in amount of interaction, exchanging complete copies of the shared objects would undesirably tie up considerable bandwidth. The slot-specific updating method in the versioning example of FIG. 3 still maintains the most efficient means for maintaining the complete shared object experience among the multiple client computers. However, because data slots may contain objects, arrays, or other non-linear data types, there is a difficulty in designating what slots to send for updates.

Figure 4:
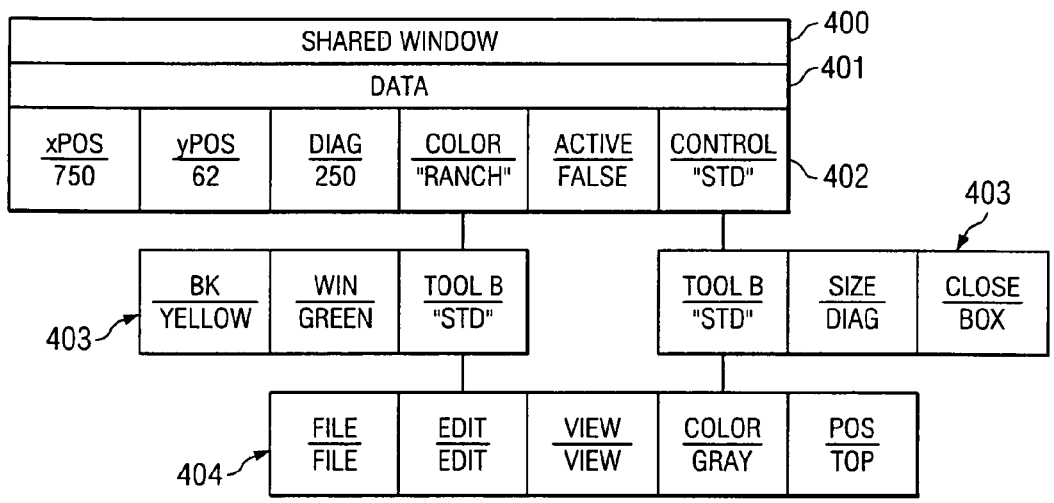
FIG. 4 is a block diagram illustrating a data property of a representative embodiment of a shared object instance configured according to the teachings of the present invention.

FIG. 4 is a block diagram illustrating data property 401 of shared object instance 40 implementing a representative embodiment configured according to the teachings of the present invention. Shared object instance 40 includes a top level, SharedWindow 400, that identifies the specific shared object. Data property 401 of SharedWindow 400 represents the data portion of shared object instance 40. Data property 401 includes data slots, at level 402, that contain the appropriate data values. The data slots at level 402 include values for xPos (750), yPos (62), diag (250), color ("Ranch"), active (False), and control ("Std"). These data slots are fictional and are intended merely to provide examples of data slot values. As such, the illustrated data slots do not represent any limitations on the type of data that may be provided for in shared objects of the present invention.

The data slots for color ("Ranch") and control ("Std") contain values that are also objects. These object values are shown at level 403. The color slot of level 402 contains reference to an object named "Ranch." For purposes of this example, "Ranch" defines an object color scheme with three properties shown in level 403. The "Ranch" object includes values for bk (yellow), win (green), and ToolB ("Std"). Bk (yellow) defines the color of the background of SharedWindow 400 as yellow, while win (green) defines the color of the window as green. The ToolB property references yet another object, "Std" for providing the presentation of SharedWindow 400's toolbar. The properties of the "Std" object of ToolB are shown in level 404.

The control slot of level 402 contains reference to an object named "Std." For purposes of this example, "Std" defines a window control scheme object with three properties shown in level 403. The "Std" control object includes values for ToolB ("Std"), size (diag), and close (box). The control-ToolB "Std" property references the same "Std" object that was referenced in the color-ToolB "Std" property. Thus, while the data slots of SharedWindow 400 may reference objects as well as discrete data values, they may also cross-reference the same objects. The control-ToolB object may only use the properties in the "Std" object of level 403 that address file (filed), edit (edit), view (view), and pos (top), while the color-ToolB object may only use the color (gray) property of the "Std" object of level 403.

In order to maintain control of the varying slot object values, the present invention provides for monitoring each node within SharedWindow 400. If any node is changed, the corresponding data slot of level 402 is marked for change. For example, if the tool bar color, which, according to the example shown in FIG. 4, is controlled by the color (gray) data slot of the "Std" object of level 403, is changed from gray to blue, both the color ("Ranch") and the control ("Std") data slots of level 402 are marked for change. The distributed shared object system recognizes when the data slots are marked for change and automatically serializes each of the trees of the two data slots for transmission to the iMCS.

Similarly, if the background color is changed from yellow to white, the color ("Ranch") data slot of level 402 is marked for change and serialized for transmission to the iMCS. By marking the data slots of level 402 for change instead of the actual node that is changed, the distributed shared object system is not only able to keep each instance of the shared object up to date, but is also able to resolve any slot cross-pollination that may occur when multiple slots reference the same object, as illustrated in FIG. 4.

Slot cross-pollination occurs when two slots reference the same object. Problems arise when the iMCS receives a reference to one of these cross-pollinated slots. At that point, it becomes imperative to determine the order in which to process the slots because which instance of the slot object gets processed first will have a direct impact on the other instance. Another problem arises when one of the cross-pollinated slots is deleted. In that scenario, one of the existing slots would point to or reference a non-existent data item in a non-existent slot. These issues require a great deal of complex code in the server to handle the inter-related slots.

The versioning system and method described as a part of the present invention also effectively eliminates slot cross-pollination, thus, eliminating the associated problems and diminishing the need for server and client complexity. Referencing the example illustrated in FIG. 4, when the color ("Ranch") and control ("Std") data slots of level 402 are marked for change, the system separately serializes the data slot tree of color ("Ranch") through levels 402-404 and the data slot tree of control ("Std") through levels 402-404. Therefore, two completely separate, serialized data streams will be sent to the iMCS. As other accessing clients are updated by the iMCS, the other clients will receive separate objects instead of the cross-pollinated reference. Thereafter, if one of the other clients updates or amends either of the color ("Ranch") and control ("Std") data slots of level 402, shared object instance 40 will be updated with a completely separate data object that will remove the slot cross-pollination. Because slot cross-pollination is removed, the server does not need to determine which slot to process first or what to do if a cross-pollinated slot is deleted.

The versioning and updating procedures for the shared objects allow for sharing information and functionality at any desired periodic rate, from a per server access to real-time updates. However, the teachings of the present invention also allow for securely storing the shared object within the local client. Instead of storing each shared object in a single, well-known area, much like cookies are stored, shared objects utilizes a simple algorithm for determining both the storage path and accessibility to the shared object. Certain embodiments of the present invention provide for a singular, known file or path to start for storing the shared objects; however, the ultimate path to the shared object from this known starting position is governed by algorithm.

Figure 5A:
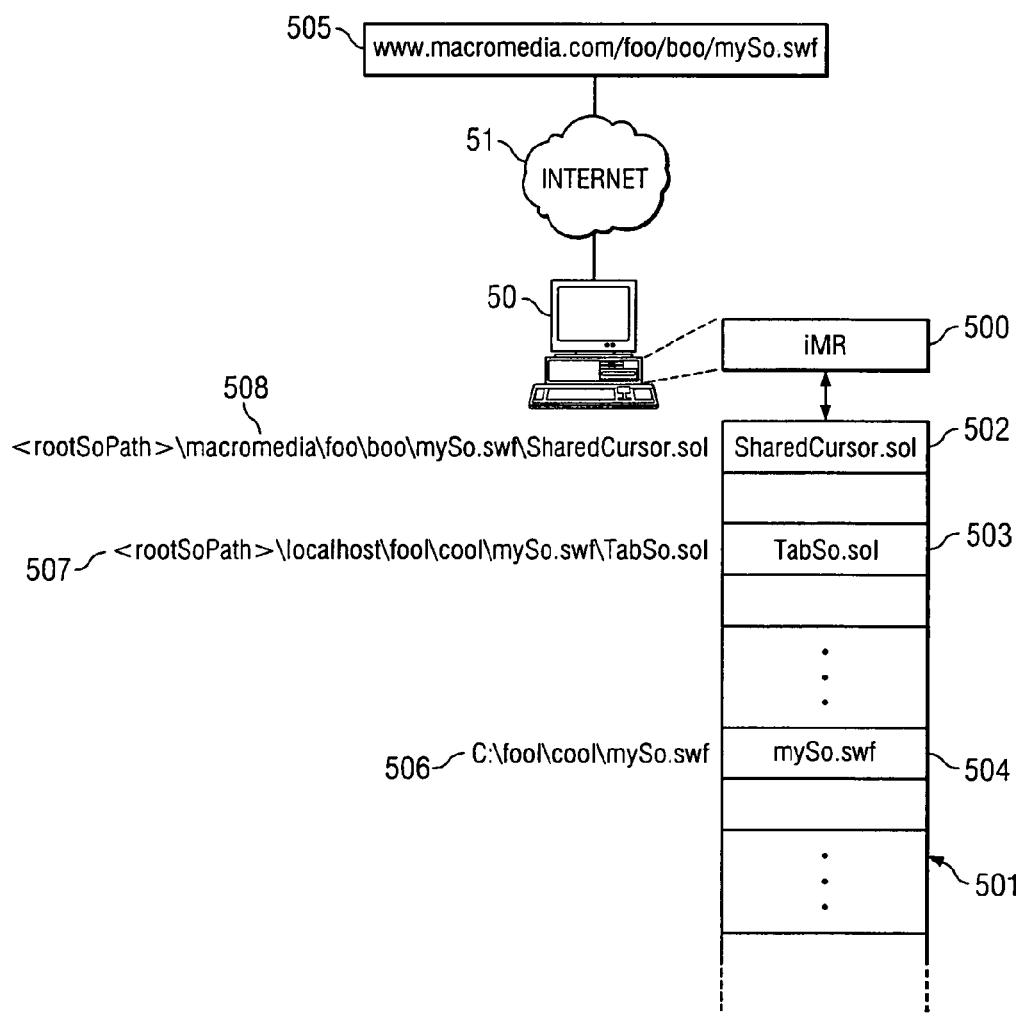
FIG. 5A is a block diagram illustrating one embodiment of the present invention storing a local shared object at the direction of an iMR.

FIG. 5A is a block diagram illustrating one embodiment of the present invention storing a local shared object at the direction of iMR 500. Client 50, running iMR 500 may display local mySo.swf 504 or remote mySo.swf 505 at www.macromedia.com/foo/boo/mySo.swf over Internet 51 with iMR 500. Either of mySo.swf 504 or 505 directs iMR 500 to store a shared object locally in memory 501 of client 50. The algorithm for storing local shared objects provides for storing the shared object from a root shared object path (i.e., a predetermined root path for all shared objects to begin from) according to the path or URL of the multimedia file, either mySo.swf 504 or 505. Thus, when iMR 500 plays remote mySo.swf 505, a local shared object, SharedCursor.sol 502, is created in memory 501 at <rootSoPath>\macromedia\foo\boo\mySo.swf\SharedCursor.sol 508, where <rootSoPath> represents the root shared path that may comprise any predetermined path such as C:/programfiles/macromedia/objects, or the like. Similarly, when iMR 500 plays local mySo.swf 504 at C:\foo\cool\mySo.swf 506, a local shared object, TabSo.sol 503, is created at <rootSoPath>\localhost\foo\cool\mySo.swf\TabSo.sol 507. Objects created from a local multimedia file each include the "localhost" file path. In one exemplary embodiment, MACROMEDIA's FLASH™ and ACTIONSCRIPT™ may be used to create the shared object. In this example using MACROMEDIA ACTIONSCRIPT™ the shared object is generated using a command, such as SharedObject.getLocal(SharedCursor) or SharedObject.getLocal(TabSo).

This filing system also controls the security regarding which multimedia files can access the data and logic stored in the shared object. Access to shared objects is domain sensitive. Therefore, SharedCursor.sol 502 at <rootSoPath>\macromedia\foo\boo\mySo.swf\SharedCursor.sol can be accessed by the multimedia file at www.macromedia.com/foo/boo/mySo.swf, but not mySo.swf 504 at C:\foo\cool\mySo.swf 506. SharedCursor.sol 502 may not be accessed by mySo.swf 504 because its domain does not match mySo.swf 505's domain. The domain sensitivity does, however, allow access by domains that are lower than the originating multimedia file. Thus, both www.macromedia.com/foo/boo/mySo.swf and www.macromedia.com/foo/boo/cool/endoCal.swf would be able to share access to SharedCursor.sol because the domain level macromedia/foo/boo/ match.

Figure 5B:
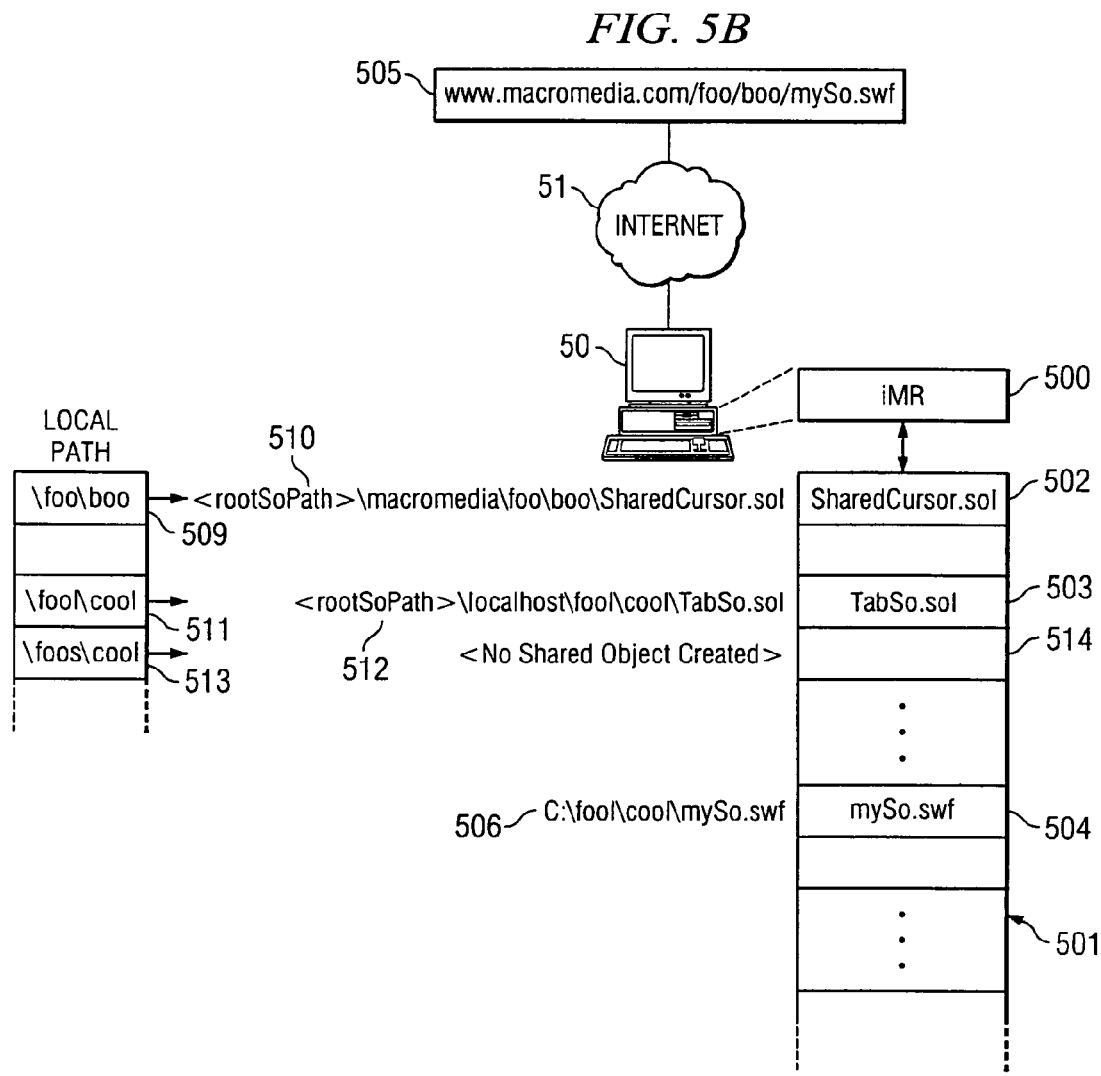
FIG. 5B is a block diagram illustrating one embodiment of the present invention storing a local shared object with an added local path string at the direction of an iMR.

In order to facilitate the sharing of local shared objects between more than one multimedia file. A local path string may be added to perform a head match against the URL path of the multimedia file. The matching portion of the path or URL is then used to create the location of the shared object. FIG. 5B is a block diagram illustrating one embodiment of the present invention storing a local shared object with an added local path string at the direction of iMR 500. As client 50 runs mySo.swf 505 on iMR 500, a call to create a shared object on memory 501 is made using a local path string. In this instance \foo\boo 509 is the local path string used. The resulting path for SharedCursor.sol 502 would then be <rootSoPath>\macromedia\foo\boo\ShareCursor.sol 510, which, as noted, uses the matched portion of local path string \foo\boo 509 and path www.macromedia.com/foo/boo/mySo.swf 505 to create the lower domain levels of path 510. As implied above, SharedCursor.sol 502 could be accessed by any multimedia file that included the domain string macromedia\foo\boo\. Therefore, by strategic use of the local path string, the local shared objects may be made more or less shareable by multimedia files run on iMR 500. Similarly, if \foo\cool 511 were used as the local path string for creating a shared object from mySo.swf 504, the resulting shared object, TabSo.sol 503 would reside at <rootSoPath>\localhost\foo\cool\TabSo.sol 512. In the example using MACROMEDIA ACTIONSCRIPT™ the shared object is generated with the local path string using a command, such as SharedObject.getLocal(SharedCursor, \foo\boo) or SharedObject.getLocal(TabSo, \foo\cool).

The local path string also is an element to the security system of the described embodiment of the present invention. For example, if mySo.swf 504 were run on iMR 500 with a local path string of \foos\cool 513, iMR 500 would not allow a shared object to be store on memory 501 in slot 514 because the path C:\foo\cool\mySo.swf 506 does not match \foos\cool 513. At this point, iMR 500 knows that mySo.swf 504 is not allowed to write to client 51 as far as the local path string \foos\cool 513 is used.

Figure 5C:
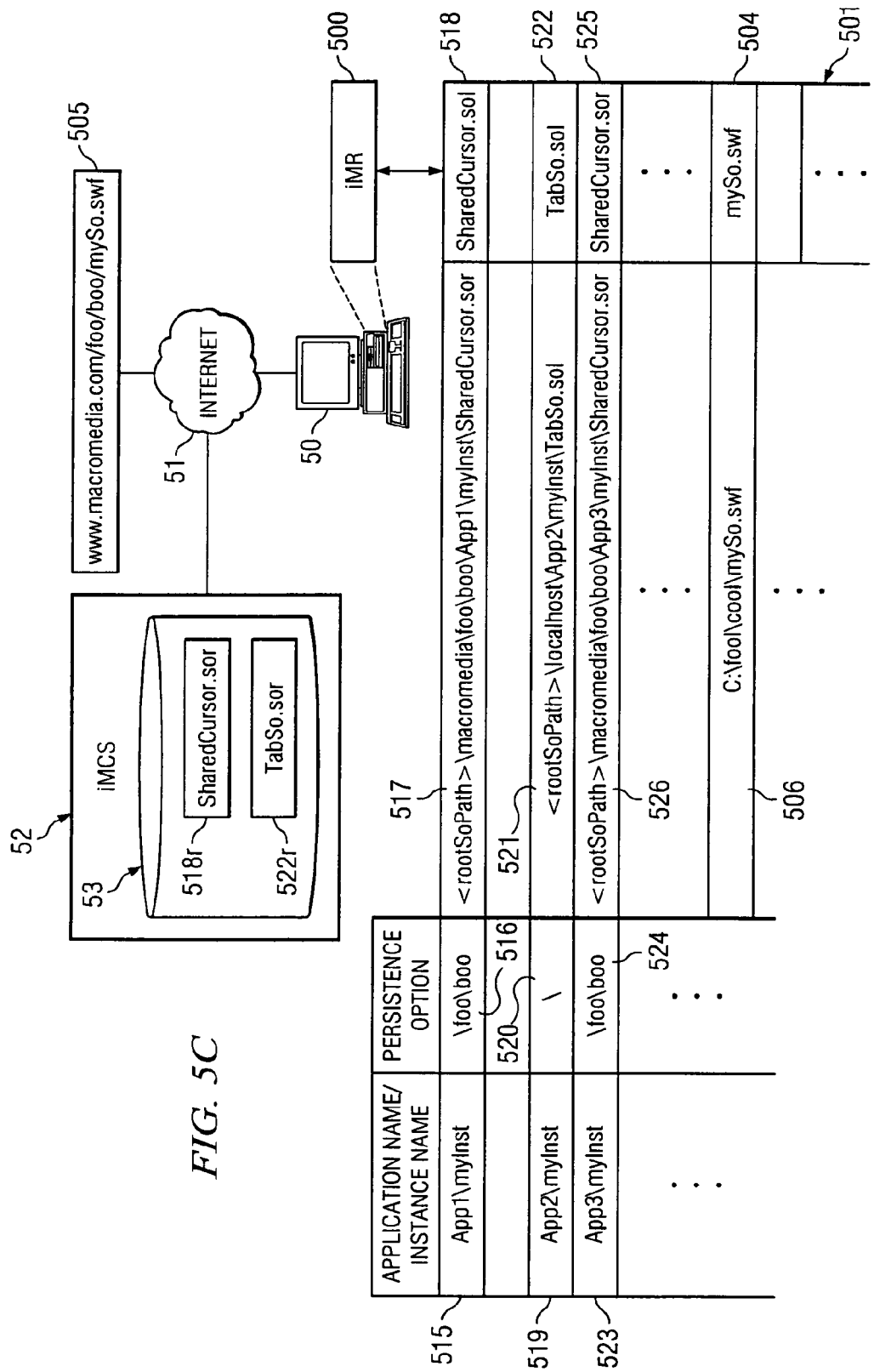
FIG. 5C is a block diagram illustrating one embodiment of the present invention for locally storing a remote shared object at the direction of an iMR.

One of the most powerful features of the various embodiments of the present invention is the ability to facilitate the remote shared objects. The locally stored instances of the remote shared objects are stored in a manner similar to the local shared objects, but in certain representative embodiments of the present invention, additional security features are included. FIG. 5C is a block diagram illustrating one embodiment of the present invention for locally storing a remote shared object at the direction of iMR 500. Client 50 may access iMCS 52 using a connection over Internet 51. Storage 53 of iMCS 52 includes remote versions of SharedCursor.sor 518*r* and TabSo.sor 522*r*. The storing of shared objects onto local memory 501 of client 50 works in a similar manner to the local shared objects. The multimedia file run on iMR 500 allows for or directs iMR 500 to store the shared object.

The embodiment described in FIG. 5C provides for the local instance of the remote shared object to be created by passing optional parameters for an application and local instance name and a persistence option, which may comprise the local path string described with regard to FIG. 5B. In operation, iMR 500 runs mySo.swf 505 over Internet 51. MySo.swf 505 may use data and logic from SharedCursor.sor 518*r*, thus, prompting iMR 500 to generate a local instance of remote shared object SharedCursor.sor 518*r*. The instance of SharedCursor.sor 518*r* is generated using application/instance parameter, App1\myInst 515, and persistence option parameter, \foo\boo 516. Pursuant to the algorithm for storing the shared objects, the local instance, SharedCursor.sor 518, is then stored at <rootSoPath>\macromedia\foo\boo\App1\myInst\SharedCursor.sor 517. Similarly, mySo.swf 504 running on iMR 500 may use data and logic from TabSo.sor 522*r*, which, along with application/instance name parameter, App2\myInst 519, and persistence option, \520, stores the shared object TabSo.sor 522 at <rootSoPath>\localhost\App2\myInst\TabSo.sor 521. In the example using MACROMEDIA ACTIONSCRIPT™ the local instance of the remote shared object may be generated using a command, such as SharedObject.getRemote(SharedCursor, App1/myInst, /foo/boo) or SharedObject.getRemote(TabSo, App2/myInst, \).

The accessibility of SharedCursor.sor 518 and TabSo.sor 522 are controlled in a similar manner as previously described, in which access is granted or denied on matching domain levels. However, in addition to the domain matching influenced by the path or URL of the multimedia document, the remote shared object security is also influenced by the particular application that is running. For example, if mySo.swf 505 were running on iMR 500 and directed creation of a local instance of SharedCursor.sor 518r using application/instance name, App3/myInst 523, and persistence option, \foo\boo 523, SharedCursor.sor 518 would be created at <rootSoPath>\macromedia\foo\boo\App3\myInst\SharedCursor.sor 526. Therefore, if SharedCursor.sor 518 were still stored on local memory 501, the running instance of mySo.swf 505 using the application, App3, would not be able to access SharedCursor.sor 518 because it had been generated using application, App1.

The functionality of the local and remote shared object is accessible to a user through an API. The storage mechanism operates in the background of the API commands. In the remote shared objects, the versioning mechanics described above also operate in the background of the API commands to update the information on the remote server in order to maintain consistency in the transactions and data. Therefore, the user does not need to understand the complexities of client-server programming. Moreover, serialization is also completed in the background of the API commands which relieves the user from writing serialization code for each communication of information between the iMR client and the iMCS server.

One example of an iMR client is MACROMEDIA's FLASH™ player. An example of an iMCS is MACROMEDIA's FLASH™ COMMUNICATION SERVER™. An example API that presents the functionality of the local and remote shared objects is MACROMEDIA's ACTIONSCRIPT™. ACTIONSCRIPT™ allows the unsophisticated Web designer to incorporate the complex versioning, storing, and communication features of shared objects into program designs by leveraging the abstract data types of ACTIONSCRIPT™ and its corresponding methods. As referenced above, after establishing the local instance of a shared object, either through the ACTIONSCRIPT™ command SharedObject.getLocal("name") or SharedObject.getRemote("name", url). Local updates to the shared object may be automatically detected and sent to the remote instance with a command, such as SharedObject.onSync, which synchronizes the two shared object instances. Furthermore, if the SharedObject.onSync command returns a confirmation of the data change, the system may be set to automatically send changes to the iMCS on periodic basis using a command, such as SharedObject.setFps, which sets a frame rate per second to send changes to the remote shared object instance. The user does not have to manage the client-server connection, nor does the user have to write serialization code or the like. The complexities of the disclosed embodiments of the shared objects are hidden behind the abstraction of the API.

When implemented in software, the elements of the present invention are essentially the code segments to perform the necessary tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
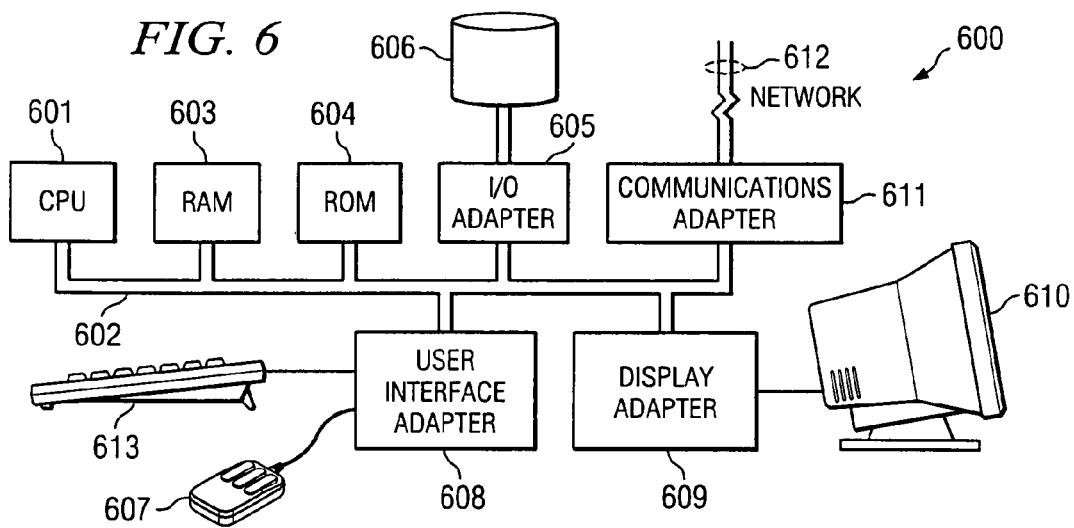
FIG. 6 depicts a block diagram of a computer system which is adapted to use the present invention.

FIG. 6 illustrates computer system 600 adapted to use the present invention. Central processing unit (CPU) 601 is coupled to system bus 602. The CPU 601 may be any general purpose CPU, such as an INTERNATIONAL BUSINESS MACHINE (IBM) POWERPC™, INTEL™ PENTIUM™-type processor, or the like. However, the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, EEPROM, Flash ROM, or the like. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects to storage devices 606, such as one or more of a hard drive, a CD drive, a floppy disk drive, a tape drive, to the computer system. The I/O adapter 605 would also allow the system to print paper copies of information, such as documents, photographs, articles, etc. Such output may be produced by a printer (e.g. dot matrix, laser, and the like), a fax machine, a copy machine, or the like. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607 to the computer system 600. The display card 609 is driven by CPU 601 to control the display on display device 610.

Figure 7:
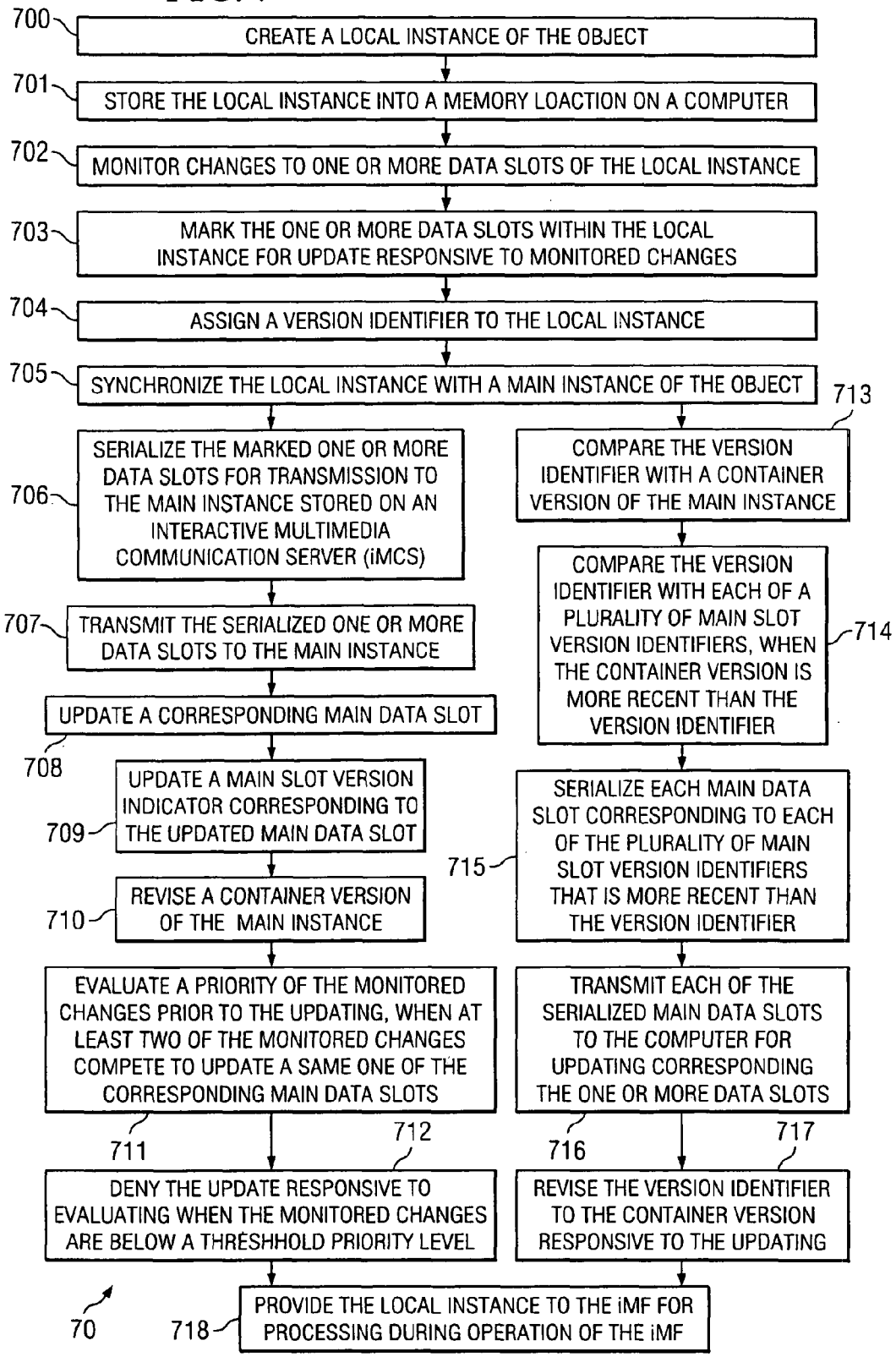
FIG. 7 is a flowchart illustrating exemplary steps 70 that may be used to implement the embodiments of the present invention.

FIG. 7 is a flowchart illustrating exemplary steps 70 that may be used to implement the embodiments of the present invention. In step 700, a local instance of the object is created. In step 701, the local instance is stored into a memory location on a computer. In step 702, changes to one or more data slots of the local instance are monitored. In step 703, the one or more data slots within the local instance are marked for update responsive to monitored changes. A version identifier is then assigned to the local instance in step 704. The local instance is synchronized, in step 705, with a main instance of the object. In step 706, the marked one or more data slots are serialized for transmission to the main instance stored on an interactive multimedia communication server (iMCS). In step 707, the serialized one or more data slots are transmitted to the main instance. In step 708, the corresponding main data slot is updated. The main slot version indicator corresponding to the updated main data slot is also updated in step 709. In step 710, the container version of the main instance is then revised. If necessary, a priority of the monitored changes is evaluated, in step 712, prior to the updating, when at least two of the monitored changes compete to update a same one of the corresponding main data slots. If step 712 is necessary, the update is denied, in step 713, responsive to evaluating when the monitored changes are below a threshhold priority level.

In some instances, the data slots on any given instance of the shared object may periodically contact the main version to check for updates. In these cases, the version identifier is compared with a container version of the main instance, in step 713. In step 714, the version identifier is compared with each of a plurality of main slot version identifiers, when the container version is more recent than the version identifier. In step 715, each main data slot corresponding to each of the plurality of main slot version identifiers that is more recent than the version identifier is serialized for transmission. Each of the serialized main data slots is then transmitted to the computer for updating corresponding the one or more data slots in step 716. The version identifier is revised, in step 717, to the container version responsive to the updating. With either path that update the versions or changes to the object, access to the local instance is provided to the iMF for processing during operation of the iMF in step 718.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
   using a computer to create a local instance of an object including multiple data slots, the local instance having a corresponding main instance of the object associated therewith;
   storing the local instance into a memory location of the computer;
   assigning an object version identifier to the local instance;
   identifying, based on the object version identifier, one or more data slots from among the multiple data slots of the local instance for synchronization;
   transmitting at least one of the identified one or more data slots to the main instance for initiating synchronization of a corresponding data slot of the main instance;
   receiving, from the main instance in response to said transmitting, (i) a container version identifier of the main instance that is more recent than the object version identifier, and (ii) one or more main data slots, each of the received one or more main data slots having an associated main slot identifier that is more recent than the object version identifier;
   updating corresponding one or more data slots of the object with the received one or more main data slots; and
   revising the object version identifier to the received container version identifier.

2. The computer-implemented method of claim 1, wherein the object version identifier is assigned based on a version identifier of at least one data slot from among the multiple data slots, such that the object version identifier is independent of a version identifier of at least another one data slot from among the multiple data slots.

3. The computer-implemented method of claim 2, wherein the version identifier of the at least one data slot is assigned as the object version identifier.

4. The computer-implemented method of claim 2, further comprising:
   determining that the at least one data slot and the at least other one data slot have changed; and
   updating the version identifier of the at least one data slot and the version identifier of the at least other one data slot, wherein the object version identifier is assigned in response to said updating the version identifier of the at least one data slot and the version identifier of the at least other one data slot.

5. The computer-implemented method of claim 1, wherein the multiple data slots comprise textual data, numerical data, logic, another object or a pointer.

6. The computer-implemented method of claim 1, wherein said storing is performed under control of a multimedia player running a multimedia file processing with the object during operation on the computer.

7. The computer-implemented method of claim 6, wherein
   the multimedia player includes an interactive multimedia runtime (iMR),
   the multimedia file includes an interactive multimedia file (iMF), and
   the main instance of the object is stored on an interactive multimedia communication server (iMCS).

8. A computer system comprising:
   a memory;
   one or more hardware processors; and
   a non-transitory computer-readable medium encoding instructions that, when executed by the one or more hardware processors, cause the system to perform operations comprising:
   creating a local instance of an object including multiple data slots, the local instance having a corresponding main instance of the object associated therewith, the main instance being stored at another computer system;
   storing the local instance into the memory;
   assigning an object version identifier to the local instance, wherein the object version identifier is assigned based on a version identifier of at least one data slot from among the multiple data slots, such that the object version identifier is independent of a version identifier of at least another one data slot from among the multiple data slots;
   determining that the at least one data slot and the at least another one data slot have changed;
   updating the version identifier of the at least one data slot and the version identifier of the at least another one data slot;
   identifying, based on at least one of the updated object version identifiers, one or more data slots from among the multiple data slots of the local instance for synchronization; and
   transmitting at least one of the identified one or more data slots to the other computer system where the main instance is stored for initiating synchronization of a corresponding data slot of the main instance.

9. The computer system of claim 8, wherein the version identifier of the at least one data slot is assigned as the object version identifier.

10. The computer system of claim 8, wherein the multiple data slots comprise textual data, numerical data, logic, another object or a pointer.

11. The computer system of claim 8, wherein the operation of storing the local instance is performed under control of a multimedia player running a multimedia file processing with the object during operation on the computer system.

12. The computer system of claim 11, wherein
   the multimedia player includes an interactive multimedia runtime (iMR),
   the multimedia file includes an interactive multimedia file (iMF), and the other computer system that stores the main instance of the object is an interactive multimedia communication server (iMCS).

13. The computer system of claim 8, wherein the operations further comprise:
receiving, from the other computer system where the main instance is stored in response to the operation of transmitting, (i) a container version identifier of the main instance that is more recent than the updated object version identifier, and (ii) one or more main data slots, each of the received one or more main data slots having an associated main slot identifier that is more recent than the updated object version identifier;
updating corresponding one or more data slots of the object with the received one or more main data slots; and
revising the updated object version identifier to the received container version identifier.

14. A non-transitory computer-readable medium encoding instructions that, when executed by a data processing apparatus, cause the data processing apparatus to perform operations comprising:
creating a local instance of an object including multiple data slots, the local instance having a corresponding main instance of the object associated therewith;
storing the local instance into a memory location of a computer;
assigning an object version identifier to the local instance, wherein the object version identifier is assigned based on a version identifier of at least one data slot from among the multiple data slots, such that the object version identifier is independent of a version identifier of at least another one data slot from among the multiple data slots;
determining that the at least one data slot and the at least another one data slot have changed;
updating the version identifier of the at least one data slot and the version identifier of the at least another one data slot;
identifying, based on at least one of the updated object version identifiers, one or more data slots from among the multiple data slots of the local instance for synchronization; and
transmitting at least one of the identified one or more data slots to the main instance for initiating synchronization of a corresponding data slot of the main instance.

15. The non-transitory computer-readable medium of claim 14, wherein the version identifier of the at least one data slot is assigned as the object version identifier.

16. The non-transitory computer-readable medium of claim 14, wherein the multiple data slots comprise textual data, numerical data, logic, another object or a pointer.

17. The non-transitory computer-readable medium of claim 14, wherein the operation of storing the local instance is performed under control of a multimedia player running a multimedia file processing with the object during operation on the computer.

18. The non-transitory computer-readable medium of claim 17, wherein
the multimedia player includes an interactive multimedia runtime (iMR),
the multimedia file includes an interactive multimedia file (iMF), and
the main instance of the object is stored on an interactive multimedia communication server (iMCS).

19. The non-transitory computer-readable medium of claim 14, wherein the operations further comprise:
receiving, from the main instance in response to said transmitting, (i) a container version identifier of the main instance that is more recent than the updated object version identifier, and (ii) one or more main data slots, each of the received one or more main data slots having an associated main slot identifier that is more recent than the updated object version identifier;
updating corresponding one or more data slots of the object with the received one or more main data slots; and
revising the updated object version identifier to the received container version identifier.

20. A computer system comprising:
a memory;
one or more hardware processors; and
a non-transitory computer-readable medium encoding instructions that, when executed by the one or more hardware processors, cause the system to perform operations comprising:
creating a local instance of an object including multiple data slots, the local instance having a corresponding main instance of the object associated therewith, the main instance being stored at another computer system;
storing the local instance into the memory;
assigning an object version identifier to the local instance;
identifying, based on the object version identifier, one or more data slots from among the multiple data slots of the local instance for synchronization;
transmitting at least one of the identified one or more data slots to the other computer system where the main instance is stored for initiating synchronization of a corresponding data slot of the main instance;
receiving, from the other computer system where the main instance is stored, and in response to the transmitting operation, one or more main data slots, each having an associated main slot identifier that is more recent than the object version identifier; and
updating corresponding one or more data slots of the object with the received one or more main data slots.

21. The computer system of claim 20, wherein the operations further comprise:
receiving, from the other computer system where the main instance is stored, and in response to the transmitting operation, a container version identifier of the main instance that is more recent than the object version identifier; and
revising the object version identifier to the received container version identifier.

22. The computer system of claim 20, wherein the operations further comprise prompting a user to set a size of storage in which to store the local instance.

23. A non-transitory computer-readable medium encoding instructions that, when executed by a data processing apparatus, cause the data processing apparatus to perform operations comprising:
creating a local instance of an object including multiple data slots, the local instance having a corresponding main instance of the object associated therewith;
storing the local instance into a memory location of a computer;
assigning an object version identifier to the local instance;
identifying, based on the object version identifier, one or more data slots from among the multiple data slots of the local instance for synchronization;

transmitting at least one of the identified one or more data slots to the main instance for initiating synchronization of a corresponding data slot of the main instance;

receiving, in response to transmission of the at least one of the identified one or more data slots to the main instance, one or more main data slots, each of the one or more main data slots having an associated main slot identifier that is more recent than the object version identifier; and updating corresponding one or more data slots of the object with the received one or more main data slots.

24. The non-transitory computer-readable medium of claim 23, wherein the operations further comprise:

receiving, in response to transmission of the at least one of the identified one or more data slots to the main instance, a container version identifier of the main instance that is more recent than the object version identifier; and revising the object version identifier to the received container version identifier.

25. The non-transitory computer-readable medium of claim 23, wherein the operations further comprise prompting a user to increase a size of storage in which to store the local instance when the local instance will exceed an existing storage allotment for the local instance.

26. A computer-implemented method comprising:

using a computer to create a local instance of an object including multiple data slots, the local instance having a corresponding main instance of the object associated therewith;

storing the local instance into a memory location of the computer;

assigning an object version identifier to the local instance, wherein the object version identifier is assigned based on a version identifier of at least one data slot from among the multiple data slots, such that the object version identifier is independent of a version identifier of at least another one data slot from among the multiple data slots;

determining that the at least one data slot and the at least another one data slot have changed;

updating the version identifier of the at least one data slot and the version identifier of the at least another one data slot;

identifying, based on at least one of the updated object version identifiers, one or more data slots from among the multiple data slots of the local instance for synchronization; and transmitting at least one of the identified one or more data slots to the main instance for initiating synchronization of a corresponding data slot of the main instance.

27. The computer-implemented method of claim 26, further comprising serializing the one or more data slots identified for synchronization.

28. The computer-implemented method of claim 26, further comprising synchronizing the local instance with the main instance.

* * * * *